US012568996B2

(12) United States Patent
Casado Bañares

(10) Patent No.: US 12,568,996 B2
(45) Date of Patent: Mar. 10, 2026

(54) ENCAPSULATED OIL

(71) Applicant: Neoalgae Micro Seaweeds Products, S.L., Asturias (ES)

(72) Inventor: Victor Casado Bañares, Asturias (ES)

(73) Assignee: Neoalgae Micro Seaweeds Products, S.L., Gijon (ES)

( * ) Notice: Subject to any disclaimer, the term of this patent is extended or adjusted under 35 U.S.C. 154(b) by 213 days.

(21) Appl. No.: 17/370,027

(22) Filed: Jul. 8, 2021

(65) Prior Publication Data

US 2022/0007698 A1     Jan. 13, 2022

(30) Foreign Application Priority Data

Jul. 8, 2020     (EP) ..................................... 20382612

(51) Int. Cl.
| | |
|---|---|
| *A23L 29/00* | (2016.01) |
| *A21D 2/36* | (2006.01) |
| *A23L 5/42* | (2016.01) |
| *A23L 17/60* | (2016.01) |

(52) U.S. Cl.
CPC ................ *A23L 17/60* (2016.08); *A21D 2/36* (2013.01); *A23L 5/42* (2016.08); *A23L 29/065* (2016.08)

(58) Field of Classification Search
CPC .......... A23L 17/60; A23L 5/42; A23L 29/065; A23L 33/115; A21D 2/36
See application file for complete search history.

(56) References Cited

U.S. PATENT DOCUMENTS

| | | | |
|---|---|---|---|
| 2010/0303989 A1 | 12/2010 | Brooks et al. | |
| 2013/0323801 A1* | 12/2013 | Chilton | ................... C12N 1/20 435/257.1 |

FOREIGN PATENT DOCUMENTS

| | | | |
|---|---|---|---|
| EP | 0622027 | 11/1994 | |
| EP | 3109315 | 12/2016 | |
| ES | 2728088 | 10/2019 | |
| WO | WO-2013166374 A2 * | 11/2013 | ............... A21D 2/36 |
| WO | WO 2016/120546 | 8/2016 | |

OTHER PUBLICATIONS

Newman T, "All you need to know about beta carotene," Dec. 14, 2017 (online), [retrieved Apr. 4, 2023]. Retrieved from the Internet <https://www.medicalnewstoday.com/articles/252758> (Year: 2017).*
Brewer A, "Tablets vs Capsules: Pros, Cons, and How They Differ," Feb. 20, 2020 (online), [retrieved Apr. 4, 2023]. Retrieved from the Internet <https://www.healthline.com/health/capsule-vs-tablet#capsule> (Year: 2020).*
European Search Report and the European Search Opinion Dated Dec. 8, 2020 From the European Patent Office Re. Application No. 20382612.8. (7 Pages).

* cited by examiner

*Primary Examiner* — Jenna A Watts

(57) ABSTRACT

The present invention relates to an encapsulated oil, more specifically to an oil encapsulated in lysed microorganisms and to the method for obtaining them.

8 Claims, No Drawings

ENCAPSULATED OIL

RELATED APPLICATION

This application claims the benefit of priority of European Patent Application No. 20382612.8 filed on Jul. 8, 2020, the contents of which are incorporated herein by reference in their entirety.

FIELD AND BACKGROUND OF THE INVENTION

The present invention relates to an encapsulated oil, more specifically to an oil encapsulated in lysed microorganisms and to the method for obtaining them.

Oils are liquid substances, lipophilic in nature and with a number of properties that can be used in human nutrition.

The application in industry and of oils depend on the preservation of their chemical composition avoiding their degradation, for this reason it is of such importance to keep the oil protected from the environment that may degrade it.

Encapsulation is a technique in which a material or mixture of materials is covered or trapped with another material. The coated component is called the active material, and the outer coating is known as the encapsulating agent or coating. The encapsulation of an oil provides protection against the oxidation induced as a consequence of UV radiation and increases the useful life of the problem and controls its release.

The stability of the coating is essential for preserving the properties of the oil.

Therefore, there are many factors that must be taken into account when encapsulating an oil, such as the coating material, the ratio between the active material and the encapsulating material, the encapsulation method chosen.

The encapsulation of oils in microalgae is known as described in European Patent EP3109315, but in this case the microalga is kept alive.

Therefore, it is necessary to develop new products that may encapsulate oil in lysed microorganisms with a high percentage thereof.

SUMMARY OF THE INVENTION

The present invention solves the problem of encapsulating a high percentage of oil while maintaining the stability of the final product without the presence of excipients. Avoiding these products is very convenient since the final product will be used in food.

Excipient: that material that is added to the active ingredients or their associations (in this case, oil-antioxidant) to act as a vehicle, enable their preparation, modify their organoleptic properties.

In addition, despite the high oil content in the final product, the difficulty of this being stable has been solved. The addition of a large quantity of oil external to the microorganism of the envelope causes the composition of the final product, its handling and its physico-chemical properties to change. As the oil ratio increases, the hydrophilic/lipophilic balance varies, compromising the stability of the final product. These problems have been solved in the present invention and a product with a high percentage of oil has been achieved.

Furthermore, all of this is achieved without using any solvent, emulsifier, binder, lubricant, densifier, disintegrant or stabilizer that are therefore not present in the final product. This aspect, taking into account that the final product can be used as a food supplement, is very beneficial because currently people look for natural products, if possible, without addition of or with the least possible amount of synthesized chemicals.

In the present invention the active material is an oil or oil mixture and the encapsulating agent is a lysed microalgae or cyanobacterium.

Therefore, the first aspect of the invention relates to an encapsulated oil comprising:

the encapsulating agent which is a lysed microalgae or cyanobacterium and an oil or oil mixture from sources other than sources of the encapsulating agent and/or an antioxidant;

wherein the concentration of the oil is between 35% and 80% by weight with respect to the total dry weight;

without other excipients other than the antioxidant.

Total dry weight refers to the total weight of the final product after a dehydration step.

In order to obtain the product of the invention, many problems have been solved and a method had to be developed taking into account a multiplicity of variables. The method for obtaining the product comprises an addition and mixing step, a breakdown of the microorganism intended to be the encapsulating agent, a homogenization step of the lysed product and a dehydration of the final product. The cell envelope breaking step is performed by emulsion. The homogenization step of the emulsion result is carried out by pressure in a range between 500 and 1000 bar, to obtain a product having adequate density, or by ultrasound in a range between 70 khz 1500 W during a period of time between 5 and 15 min, so that the temperature is not excessive and the oil is not degraded.

The dehydration step has been another key step to obtain the product of the invention. It has been found that among all the possible types of dehydration, the dehydration by lyophilization is the most adequate since, as the product is more oily, a high viscosity mixture is generated. This high viscosity makes the dehydration step difficult, it is also necessary to preserve the oxidative stability of the oil at this step, so as not to degrade it.

Therefore, a second aspect of the invention refers to a method for obtaining the encapsulated oil of the first aspect of the invention, comprising the steps of:

a) adding an oil to microalgae or cyanobacteria, oil from sources other than these microalgae or cyanobacteria in the presence of water; the oil is added in a percentage comprised between 6% and 40% by weight with respect to the total weight;

b) breaking the cell envelope: cell wall and/or plasma membrane of the microorganism by stirring until emulsion.

c) homogenizing the emulsion by pressure in a range between 500 and 1000 bars or by ultrasound in a range between 70 khz to 90 khz of frequency and 1500 W to 1800 W of power for a period of time between 5 and 15 min and d) dehydrating the product obtained in step b) by lyophilization.

Total weight refers to the sum of the weight of the microalgae or cyanobacteria, plus the weight of the oil, plus the weight of the water.

The encapsulated oil defined in the first aspect of the invention has a powdery appearance that can be introduced into a capsule.

Therefore, a third aspect of the invention is a capsule comprising the product of the first aspect of the invention.

Encapsulated oils can have an application as a food supplement. Therefore, a last aspect of the invention is the use of the product defined in the first and third aspects of the invention as a food supplement.

DESCRIPTION OF SPECIFIC EMBODIMENTS OF THE INVENTION

Therefore, the first aspect of the invention relates to an encapsulated oil comprising:

the encapsulating agent which is a lysed microalgae or cyanobacterium and an oil or oil mixture from sources other than sources of the encapsulating agent and/or an antioxidant;

wherein the concentration of the oil is between 35% and 80% by weight with respect to the total dry weight;

without other excipients other than the antioxidant.

Preferably the concentration of the oil is between 50% and 70% by weight with respect to the weight of the microorganism.

Preferably the oil is an oil from one of the following microorganisms: *Haematococcus pluvialis, Schizochytrium; Phaeodactylum tricornutum; Dunaliella salina, Tetraselmis chuii, Nannochloropsis, Navicula, Porphyridium* or *Isochrisys.*

Mixtures of these oils are also contemplated in the present invention, thus the oil is a mixture of oils from: *Haematococcus pluvialis* and *Schizochytrium; Haematococcus pluvialis* and *Phaeodactylum tricornutum; Haematococcus pluvialis* and *Dunaliella salina; Haematococcus pluvialis* and *Tetraselmis chuii;, Haematococcus pluvialis* and *Nannochloropsis; Haematococcus pluvialis* and *Navicula; Haematococcus pluvialis* and *Isochrisys; Schizochytrium* and *Phaeodactylum tricornutum; Schizochytrium* and *Dunaliella salina; Schizochytrium* and *Tetraselmis chuii; Schizochytrium* and *Nannochloropsis; Schizochytrium* and *Navicula; Schizochytrium* and *Isochrisys; Phaeodactylum tricornutum* and *Dunaliella salina, Phaeodactylum tricornutum* and *Tetraselmis chuii, Phaeodactylum tricornutum* and *Nannochloropsis, Phaeodactylum tricornutum* and *Navicula, Phaeodactylum tricornutum* and *Isochrisys; Dunaliella salina* and *Tetraselmis chuii; Dunaliella salina* and *Nannochloropsis; Dunaliella salina* and *Navicula; Dunaliella salina* and *Isochrisys; Tetraselmis chuii* and *Nannochloropsis; Tetraselmis chuii* and *Navicula; Tetraselmis chuii* and *Isochrisys; Nannochloropsis* and *Navicula; Nannochloropsis* and *Isochrisys; Navicula* and *Isochrisys.; Haematococcus pluvialis* and *Porphyridium; Schizochytrium* and *Porphyridium; Phaeodactylum tricornutum* and *Porphyridium; Dunaliella salina* and *Porphyridium; Tetraselmis chuii* and *Porphyridium; Nannochloropsis* and *Porphyridium; Navicula* and *Porphyridium o Porphyridium* and *Isochrisys.*

The oil is preferably selected from: astaxanthin, DHA (docosahaexanoic acid), EPA (eicosapentaenoic acid), fucoxanthin, beta-carotene and the mixtures: astaxanthin and DHA, astaxanthin and EPA, astaxanthin and fucoxanthin, astaxanthin and beta-carotene, DHA and EPA, DHA and fucoxanthin, DHA and beta carotene, or fucoxanthin and beta carotene.

In particular, the microalgae or cyanobacterium is *Arthrospira.*

As mentioned above, the second aspect refers to a method for obtaining the encapsulated oil of the first aspect of the invention and of any of its embodiments, comprising the steps of:

a) adding an oil to microalgae or cyanobacteria, oil from sources other than these microalgae or cyanobacteria in the presence of water; the oil is added in a percentage comprised between 6% and 40% by weight with respect to the total weight;

b) breaking the cell envelope: cell wall and/or plasma membrane of the microorganism by stirring until emulsion and;

c) homogenizing the emulsion by pressure in a range between 500 and 1000 bars or by ultrasound in a range between 70 khz to 90 khz of frequency and 1500 W to 1800 W of power for a period of time between 5 and 15 min;

d) dehydrating the product obtained in step b) by lyophilization.

Stirring is preferably carried out in a temperature range between 5° and 15° C. to ensure the oxidative stability of the oil. The density of the mixture is higher at this temperature and this also contributes to obtaining the final product.

EXAMPLES

The following examples are only illustrative of this invention, and are not to be construed as limiting thereof.

Example 1

1000 grams of *Arthrospira platensis* were incorporated into a stirred reactor in 4000 milliliters of distilled water at room temperature. After 10 minutes, 1000 ml of *Haematococcus pluvialis* oil was introduced, maintaining stirring until an emulsion was obtained.

This mixture was kept under stirring while it was passed through a homogenizer at 1000 bar and collected in trays. The lyophilization step was then carried out by freezing the trays at −40° C. and drying them under vacuum.

Once the product had been dried, it was ground and the powder generated was incorporated into capsules.

Example 2

1000 grams of *Arthrospira platensis* in 4000 milliliters of distilled water at 10° C. After 10 minutes, 1000 ml of *Haematococcus pluvialis* oil was introduced. This mixture was kept under stirring until emulsion while ultrasound was applied at 70 Khz and 1500 W for 10 minutes and collected in trays. The lyophilization step was then carried out by freezing the trays at −40° C. and drying them under vacuum.

Once the product had been dried, it was ground and the powder generated was incorporated into capsules.

What is claimed is:

1. An dehydrated encapsulated oil comprising:

an encapsulating agent which is a lysed microalgae or cyanobacterium coating; and an oil or oil mixture from sources other than the encapsulating agent sources;

characterized in that the concentration of the oil is between 35% and 80% by weight with respect to the total dry weight of the dehydrated encapsulated oil;

without excipients other than antioxidants.

2. The dehydrated encapsulated oil according to claim 1 characterized in that the concentration of the oil is between 50% and 70% by weight with respect to the weight of the lysed microalgae or cyanobacterium encapsulating agent.

3. The dehydrated encapsulated oil according to claim 1, characterized in that the oil is an oil from one of the following microorganisms: *Haematococcus pluvialis, Schizochytrium; Phaeodactylum tricornutum; Dunaliella salina, Tetraselmis chuii, Nannochloropsis, Navicul, Porphyridium* or *Isochrisys.*

4. The dehydrated encapsulated oil according to claim 1 characterized in that the oil is selected from: astaxanthin, DHA (docosahaexanoic acid), EPA (eicosapentaenoic acid), fucoxanthin, beta-carotene and the mixtures: astaxanthin and DHA, astaxanthin and EPA, astaxanthin and fucoxanthin, astaxanthin and beta-carotene, DHA and EPA, DHA and fucoxanthin, DHA and beta carotene or fucoxanthin and beta-carotene.

5. The dehydrated encapsulated oil according to claim 1 characterized in that the microalgae or cyanobacterium is *Arthrospira*.

6. A method for obtaining a dehydrated encapsulated oil that comprises the steps of:

a) adding an oil to microalgae or cyanobacteria, wherein i) the added oil of a) is an oil from sources other than these microalgae or cyanobacteria;

ii) said adding is performed in the presence of water;, and iii) the added oil is added in a percentage comprised between 6% and 40% by weight with respect to the total weight of the microalgae or cyanobacteria, plus the weight of the oil, plus the weight of the water;

b) breaking the cell wall and/or plasma membrane of the microalgae or cyanobacteria by stirring until to produce an emulsion;

c) homogenizing the emulsion by pressure in a range between 500 and 1000 bars or by ultrasound in a range between 70 khz to 90khz of frequency and 1500W to 1800W of power for a period of time between 5 and 15 min and d) dehydrating the homogenized emulsion obtained in step b) c) by lyophilization, thereby producing a dehydrated encapsulated oil comprising an encapsulating agent which is a lysed microalgae or cyanobacterium coating, where the oil or oil mixture is from sources other than the encapsulating agent sources.

7. The method according to claim 6 characterized in that the stirring of step b) is carried out in a temperature range between 5° and 15° C.

8. A capsule comprising the dehydrated encapsulated oil defined in claim 1.

\* \* \* \* \*